Figure 1:
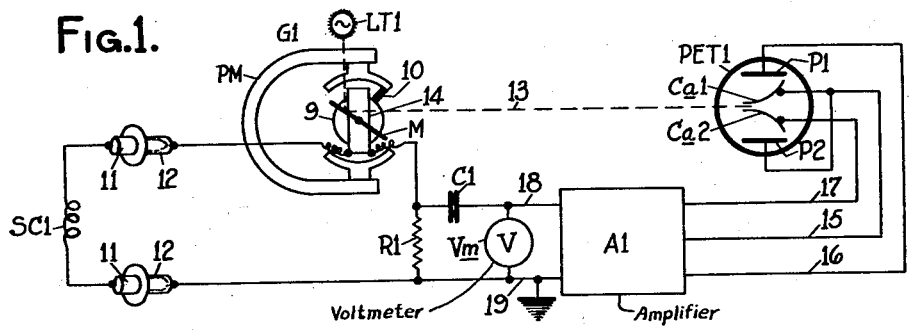

Sept. 11, 1951     R. H. DICKE     2,567,276

ELECTRIC CURRENT INTEGRATING APPARATUS

Filed Dec. 26, 1947     2 Sheets-Sheet 1

INVENTOR.
ROBERT H. DICKE
BY Oscar H. Dicke
HIS ATTORNEY

Sept. 11, 1951 R. H. DICKE 2,567,276
ELECTRIC CURRENT INTEGRATING APPARATUS
Filed Dec. 26, 1947 2 Sheets-Sheet 2

INVENTOR.
ROBERT H. DICKE
BY Oscar H. Dicke
HIS ATTORNEY

Patented Sept. 11, 1951

2,567,276

UNITED STATES PATENT OFFICE 2,567,276

ELECTRIC CURRENT INTEGRATING APPARATUS

Robert H. Dicke, Princeton, N. J.

Application December 26, 1947, Serial No. 794,027

9 Claims. (Cl. 171—95)

This invention relates to variable current and/or variable voltage pulse or surge integrating meters and more particularly to a meter of this kind which is extremely sensitive and accurate and which lends itself to a multiplicity of scale readings to afford measurements over a large range of values.

In order to measure the quantity of current flow due to a variable temporarily existing voltage or current flow, which follows no particular law of variation, it is necessary to integrate the successive increments of the current flow. One example of such a problem presents itself when it is desired to measure total magnetic flux or flux density, as the case may be, of a magnet or the earth's field by moving a search coil effectively into or out of the magnetic field, when the speed of such movement is not known and may be variable. One of the difficulties in accurately measuring such a voltage or current integration is that the losses in the instrument itself bring about inaccuracies.

In view of the foregoing and other important considerations it is proposed in accordance with the present invention to construct the apparatus by the inclusion of electronic amplifiers in a manner such that the amplifying ratios of the electronic tubes is not a factor entering into the accuracy of the apparatus and may even vary during the period of current or voltage integration.

Another object of the present invention resides in the construction of the apparatus so that the same apparatus may be used for both voltage and current integration.

A Grassot meter differs from a ballistic galvanometer, both of which may be used, in that a low return period is obtained in a ballistic galvanometer by increasing the inertia of the moving element whereas in the Grassot instrument this low period is obtained by decreasing the returning torque. The latter is therefore the most sensitive instrument. A Grassot meter or a ballistic galvanometer is used only in the Fig. 4 construction.

Another object of the invention resides in the provision of means to enable the reading of the capacity of a condenser if the voltage of a charge thereon is known.

Another object of the invention resides in the provision of a search coil the dimensions of which and number of turns of which is known to be used with the apparatus so as to enable flux density or total flux, as the case may be, of a magnetic field to be measured.

Another object resides in the provision of means to enable the inductance of an inductive reactor to be read, if the direct current originally applied thereto is known.

Another object of the invention resides in the provision of numerous adjustments to change constants of the apparatus in order to provide numerous scale calibrations each characterizing a different degree of sensitivity of the apparatus.

Another object of the invention resides in the construction of the apparatus so that practically no energy from the source to be integrated is consumed by the apparatus. This enables a search coil having many turns of fine wire to be used so that magnetic field strength of almost zero intensity can be measured and it also enables the capacity of extremely small condensers to be measured.

Another object of the present invention resides in the provision of a shunt whereby a potential integrating apparatus may be used for integrating current pulses.

Another object of the invention resides in the construction of the apparatus so that its accuracy, even when integrating extremely small voltages or currents, depends only on the accuracy of the voltmeter or milliammeter used with the apparatus and the constants of precision components of resistance and capacity used, all of which are available on the market. Although a galvanometer and an amplifier are used as elements of the particular embodiments of the invention disclosed, neither the accuracy of the galvanometer nor the stability of the amplifying factors of the amplifying tubes used as elements of the apparatus impair the accuracy of the resulting readings.

Figure 2:
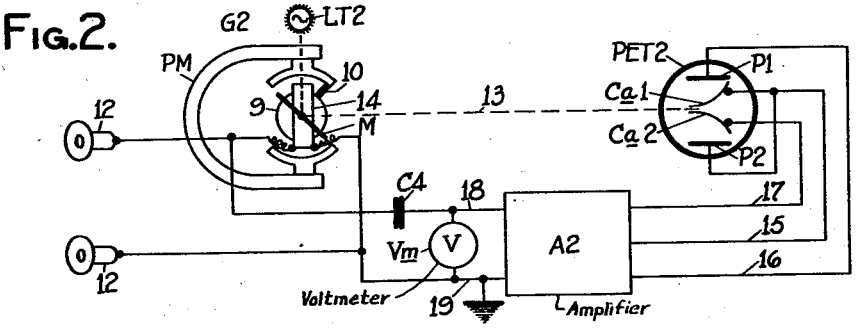
Figure 3:
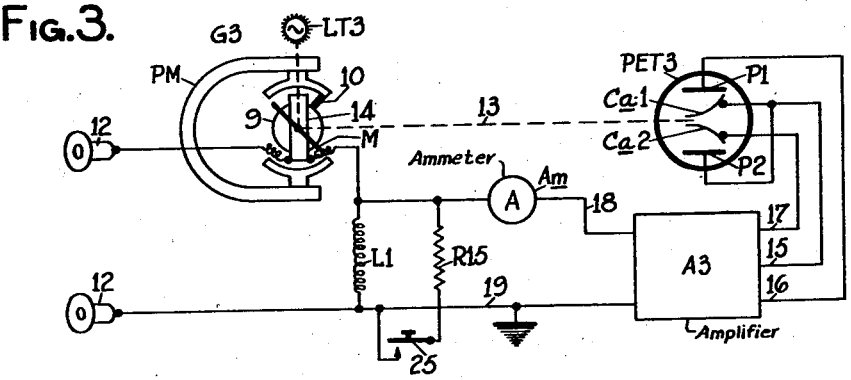
Figure 4:
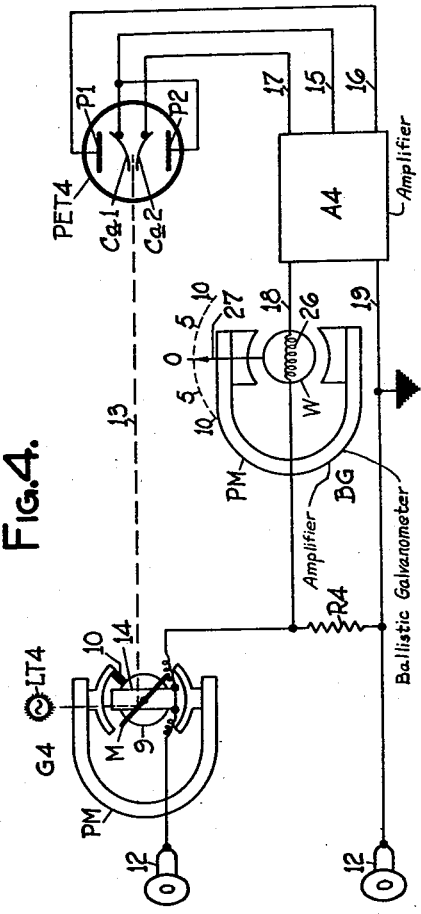
Figure 5:
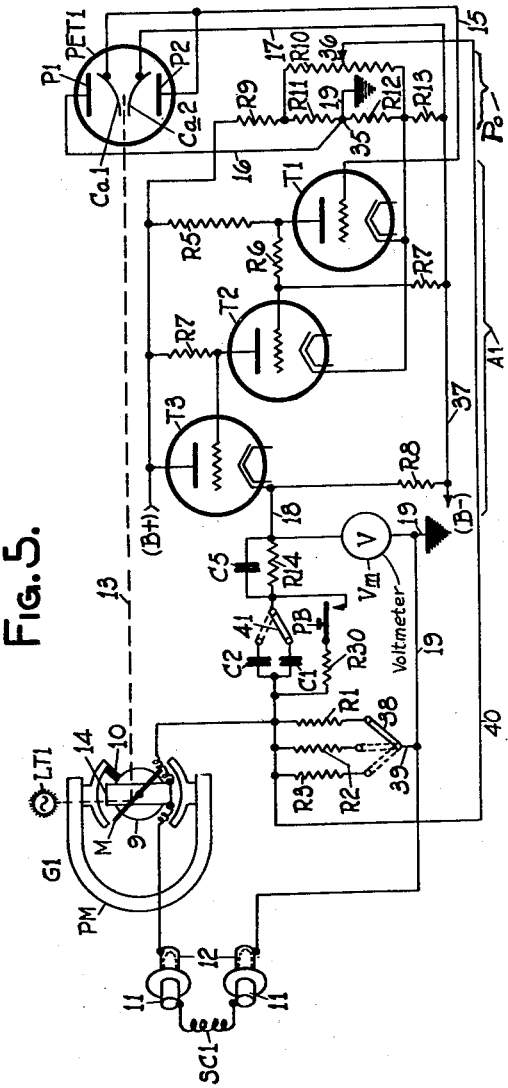
Figure 1A:
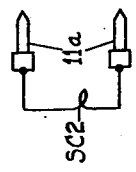
Figure 1B:
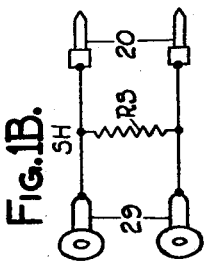
Figure 1C:
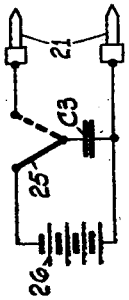

Other objects, purposes and characteristic features of the invention will in part be pointed out hereinafter and will in part be obvious from the accompanying drawings of which:

Fig. 1 shows conventionally one embodiment of the invention;

Figs. 1A, 1B, and 1C illustrate a different turn search coil, an ampere shunt, and a capacity test adapter respectively;

Figs. 2, 3, and 4 illustrate three other forms the present invention may take and of which Fig. 2 constitutes a current integrating device; and Fig. 5 illustrates in more detail the embodiment of the invention illustrated in Fig. 1 together with means for electrically adjusting the drift so as to cause the instrument to normally assume the zero indicating position.

*Structure Fig. 1.*—By referring to Fig. 1 it will be seen that a search coil $SC_1$ has by its plugs 11 been illustrated plugged into the two receptacle sockets 12 of the integrating apparatus. This apparatus includes a galvanometer $G_1$ including a permanent magnet PM for producing a strong magnetic field in which a coil 14 is preferably suspended by a suspension ribbon. This coil 14 supports a mirror M which projects a beam of light from the lamp $Lt_1$ upon the two cathodes $Ca_1$ and $Ca_2$ of two single or one double photoelectric tube $PET_1$. This galvanometer movable coil 14 is supported so as to surround the stationary core or cylinder 9 of magnetic material, this stationary core being used to reduce the reluctance of the permanent magnet produced magnetic field and to thereby produce a strong magnetic field in the airgap in which the coil 14 moves. The core 9 as shown is supported by the upper pole shoe by suitable non-magnetic material such as brass or insulation 10. The circuit through the search coil $SC_1$ includes the coil 14 of the galvanometer and the precision resistance $R_1$. The plate $P_2$ of the photo-electric tube $PET_1$ is connected to the cathode $Ca_1$ so that this junction point constitutes an intermediate point in the potential gradient through this tube and a wire 15 leads from this point to the amplifier grid (see Fig. 5). The other two wires 16 and 17 leading from plate $P_1$ and cathode $Ca_2$, respectively, of tube $PET_1$ are connected to the positive and negative terminal, respectively, of a plate source of current. The output leads 18 and 19 of the amplifier $A_1$ are connected to a circuit including the condenser $C_1$ and the resistance $R_1$ in series, a voltmeter $Vm$ being connected across the output leads 18 and 19 of the amplifier $A_1$. In practice the light beam from lamp $Lt_1$ reflected from the mirror M strikes the two cathodes $Ca_1$ and $Ca_2$ of photo-electric tube $PET_1$ in a manner such that zero potential exists across the voltmeter $Vm$. This may be accomplished by drift adjusting means such as disclosed in Fig. 5 and described hereinafter or, if desired, the galvanometer $G_1$ may be adjusted mechanically by adjusting its return suspension spring to produce such result. The galvanometer $G_1$ is preferably very sensitive and has an extremely low centering torque but need not have any particular graduation or number of turns on its coil 14.

*Operation Fig. 1.*—Let us assume that the proper mechanical or electrical drift adjustment has been made in the Fig. 1 structure to cause the voltmeter $Vm$ to indicate zero. Let us now assume that the search coil $SC_1$ is moved at any speed either fixed or variable but preferably at a low speed, into a magnetic field. This will cause varying voltages to be induced into search coil $SC_1$ in accordance with the varying rate at which magnetic lines entering the coil have been cut. These voltages cause slight movement of the coil 14 of the galvanometer $G_1$ as a result of which the light beam 13 is deflected and the amplifier $A_1$ is controlled to cause this amplifier to produce feed back current flow through condenser $C_1$ and resistance $R_1$ to cause the resistance $R_1$ to develop a voltage drop or counter voltage which substantially equals but is in an opposite direction to the voltage induced originally into the search coil $SC_1$. This will cause current flow into the condenser $C_1$ at each instant proportional to the voltage then existing at the terminals of the search coil SC and therefore the condenser $C_1$ constitutes the accumulator reservoir of an electrical integrating device. When the voltage induced in search coil $SC_1$ falls to zero, as it will when the magnetic lines to be measured have all penetrated the search coil, the voltmeter $Vm$ may be read to read the potential to which the condenser $C_1$ has been charged. The condenser remains charged for a considerable period, possibly 20 minutes, because the amplifier $A_1$ continues to maintain a potential across its output leads in a direction to hold this charge. No current however flows through resistance $R_1$ or search coil $SC_1$ due to this potential. This function is accomplished in this way. If a very minute current flows from condenser $C_1$ in a discharging direction this current flows more readily through the galvanometer and search coil than through resistance $R_1$. This current flows, and to a very slight extent only, through galvanometer $G_1$ in the same direction it originally flowed due to magnetic lines entering the search coil SC for reasons presently pointed out. This current will therefore act through galvanometer $G_1$ and photo-electric tube $PET_1$ to cause the amplifier $A_1$ to hold its plate potential applied to voltmeter $Vm$ substantially where it was when voltage ceased to be induced in search coil $SC_1$. This process of having the amplifier suppress discharging of the condenser $C_1$ and at the same time supply the additional current which flows through the voltmeter $Vm$ enables a very accurate reading to be obtained in that ample time for allowing the voltmeter pointer to come to rest is afforded. It is thus seen that current flows from the amplifier $A_1$ and into the condenser $C_1$ during each increment of time that potential is induced into the search coil and of a value commensurate to such potential, because the voltage drop caused by this current flowing over $R_1$ is substantially exactly equal to and opposite to that of the voltage induced in the search coil $SC_1$ and the charge in the condenser $C_1$ is therefore an indication of the voltage integration, that is, is a product of each increment of voltage and the time such voltage existed, and this is proportional to the total number of magnetic lines that entered or left, as the case may be, the search coil $SC_1$. The fact that the energy for charging the condenser is supplied by the amplifier $A_1$ and not by the search coil renders the apparatus extremely accurate, based of course on the assumption that the voltmeter $Vm$ is accurate and that the precision resistor $R_1$ and precision condenser $C_1$ are of good quality and have constant known values. By looking at the movable element of the galvanometer through a jeweler's magnifying glass when the apparatus was in use no movement of this element or coil 14 could be observed. This is due to the fact that as soon as galvanometer coil 14 and mirror M move to an unnoticeable extent an output current is produced by the amplifier $A_1$ which flows in a direction through resistance $R_1$ to result in a counter-voltage which is almost exactly equal to and opposes the voltage induced in search coils $SC_1$ and to thereby prevent further movement of the coil 14. The current flowing in the output circuit of the amplifier $A_1$ is therefore at all times substantially proportional to the potential induced in this search coil. It should be understood that search coils of various diameters, shapes, and number of turns (see Fig. 1A) may be used with the instrument or apparatus of Fig. 1 and that dial switches for inserting various precision condensers and precision resistances, as shown in Fig. 5, may be employed in the Fig. 1 construction. In order to accelerate the discharging of the condenser $C_1$ a shunting contact or push button PB such as shown in Fig. 5 may be provided.

*Structure Fig. 2.*—The form of invention illustrated in Fig. 2 is particularly designed for current integration. In this connection it should be understood that the Fig. 1 construction may be used for current integration if the current to be integrated is allowed to flow through the shunt SH illustrated in Fig. 1B to thereby convert current flow into corresponding potential drop. In the Fig. 2 structure the galvanometer $G_2$ is included in the circuit the current of which is to be integrated but only an insignificant portion of this current actually flows through the galvanometer because the amplifier $A_2$ produces the equivalent of a current sucking effect to an extent that substantially all of the current pulse passing through the circuit, and to be integrated, passes through condenser $C_4$ and amplifier $A_2$ and builds up an integrating charge in this condenser. Except for the difference that the condenser $C_4$ is connected directly to the receptacle 12 and the resistance unit $R_1$ of Fig. 1 is replaced by a low resistance wire, the Fig. 2 construction is identical to the Fig. 1 construction, and therefore like parts have been designated by like reference characters having distinctive suffixes.

*Operation Fig. 2.*—To use the apparatus illustrated in Fig. 2 the circuit in which the current pulse to be integrated flows is opened and the two wires formed by such opening are plugged into the two receptacles 12 of Fig. 2. It is assumed that drift was adjusted to a point where the voltmeter $Vm$ indicates zero beforehand. As the current pulse to be integrated tries to pass through galvanometer $G_2$ the light beam 13 is so quickly deflected and the amplifier $A_2$ so quickly produces a voltage of the proper polarity to cause substantially all the current of the current pulse to be measured to pass through condenser $C_4$. This causes a charge to be built up in the condenser $C_4$ commensurate with the current integration. This charge is of course read on the voltmeter $Vm$ the same as in the Fig. 1 construction. The voltmeter $Vm$ will remain in its indicating position for a long time because the tendency for the condenser to discharge through the galvanometer $G_2$ produces a voltage in the output circuit of the amplifier $A_2$ of a polarity as did the original current so that the condenser $C_4$ is discharged extremely slowly. The capacity of the condenser shown in Fig. 1C may, for instance, be measured by using the apparatus shown in this Figure 1C with the apparatus shown in Fig. 2. To measure the capacity of any condenser, such as condenser $C_3$ for instance, the plugs 21 of Fig. 1C are plugged into the receptacles 12 of Fig. 2 and the switch 25 is placed in its left hand position until the condenser $C_3$ has been charged to a particular voltage presumably the voltage of battery 26. The switch 25 is then thrown to the right and after the voltmeter $Vm$ of Fig. 2 has reached a stable indication position the voltage is read. By these two voltage readings and the capacity of the condenser $C_4$ which is known, the capacity of condenser $C_3$ may be determined by the algebraic expression $$C_3 = C_4 \frac{Vm}{Vb}$$

where $Vb$ represents the voltage of battery 26. What has been said in regard to determining the capacity of condenser $C_3$ of Fig. 1C is also true of determining the inductance of an inductance unit by allowing current from an inductive kick to pass through the apparatus of Fig. 2.

*Structure Fig. 3.*—In the Fig. 3 construction the accumulator or integrator comprises an inductive reactor $L_1$ and an ammeter $Am$ which is used to indicate the strength of the magnetic field that has been built up and stored in inductive reactor $L_1$. That is, the measure of the potential energy that is stored in the magnetic field of the inductive reactor $L_1$ is indicated by the strength of the magnetic field as manifested by the current flow through such reactor to build it up. It will be seen that the reactor $L_1$ and ammeter $Am$ are included in series across the output terminals 18—19 of the amplifier $A_3$. The Fig. 3 construction like that of Figs. 1 and 4 is a potential integrating apparatus in that the current eventually built up in the inductive reactor $L_1$ is proportional to the sum of the increments of voltages (counter E. M. F.) appearing across the reactor during the building up of such field. The galvanometer $G_3$ is included in series with the inductive reactor $L_1$ and since the galvanometer, photo-electric and amplifier structure is such as to hold the galvanometer current substantially at zero the counter E. M. F. induced in reactor $L_1$, by current principally derived from the amplifier, is substantially equal to the voltage increments appearing across receptacles 12 of Fig. 3. These voltage increments might, for instance, be the falling voltage appearing across the condenser $C_3$ as it is discharged through a resistance, $Rs$ of Fig. 1B.

*Operation Fig. 3.*—If one of the search coils $SC_1$ or $SC_2$ is plugged into receptacles 12 of Fig. 3 and this search coil is moved so that the magnetic field to be measured is suddenly, or at any medium constant or variable speed, cut by all of the turns of the search coil a voltage appears across the terminals of the search coil varying with the rate of cutting of magnetic lines by the conductors of the search coil. Each increment of this voltage results in a corresponding increment of voltage being applied across the reactor L by the output leads 18 and 19 of the amplifier $A_3$. Since each increment of voltage present across the reactor $L_1$ causes a corresponding increase in current flowing through this reactor, the total current flowing through reactor $L_1$ which may be read on the ammeter $Am$ is a measure of the sum of the increments of voltages induced in search coil $SC_1$ or $SC_2$, and is a measure of the total magnetic flux linking the search coil. If now the inductive reactor $L_1$ is fully discharged by closing, for a moment only, the reset switch 25 and the search coil is then removed from the magnetic field to be measured the same reading, namely a check reading, will be given except that the ammeter will read backwards, it being assumed that an ammeter is used having its zero reading at an intermediate point on the scale.

*Structure Fig. 4.*—The Fig. 4 construction is identical to the Figs. 1 and 5 construction except that the condenser $C_1$ has been replaced by the ballistic galvanometer BG. This ballistic galvanometer is calibrated in coulombs for which reason the voltmeter $Vm$ is no longer a necessary element of the system and has been omitted from the drawing, although it may retained without impairing the accuracy of the apparatus. A ballistic galvanometer is an instrument having a relatively heavy moving element as conventionally illustrated by the flywheel or mass W and is biased to a zero position by a suspension balance having an extremely long period such that it will not be difficult to read the maximum swing of the needle. By this slow period characteristic it will be capable of integrating voltage over a considerable period of time. Although the suspension structure of the galvanometers $G_1$, $G_2$, $G_3$, $G_4$ and BG have not been specifically illustrated it should be understood that preferably an upper and a lower suspension conducting tape is employed in each instrument and that these tapes are insulated from each other and that one tape is used to conduct current into the dynamometer coil whereas the other tape conducts the current from the coil. By reason of the slow period of the galvanometer BG its coil 26 will not have materially changed its position by the end of the period during which voltage integration takes place. The coil and pointer keep on moving however for reasons given below. The amplifier produced current, variable in practice, causes kinetic energy to be built up in the flywheel or core wheel which is proportional to the current integration and this current at each instant is proportional to the voltage impressed across receptacles 12 of Fig. 4 by the search coil. This kinetic energy produces an arc of swing of the needle 27 against the bias of the tortional suspension spring proportional to this kinetic energy that is, converts it into potential energy, by flexing the spring, so that the scale of the galvanometer BG may be, and in practice is, calibrated in coulombs, and by using the proper multiplying constant, as determined from resistance of unit $R_4$ and the number of turns in coil $SC_1$, may be read in magnetic lines or Gauss.

Instead of using a ballistic galvanometer as shown in Fig. 4 a so-called Grassot meter may be used to perform the integrating function. This Grassot meter when used is connected the same as is the ballistic galvanometer BG in Fig. 4, and has all the attributes of the ballistic galvanometer and has the additional ballistic attribute of having a smaller mass and a correspondingly lighter suspension balance and furthermore is strongly damped by its winding which moves in a very strong magnetic field. For convenience, these two instruments both of which have variable surge or pulse integrating ability will be called "dynamic energy storing and indicating means." Each of these instruments will produce an arc of swing of its moving element proportional to the average strength of an electrical surge times the time duration of such surge, that is, an arc of swing proportional to the sum of the increments of such surge.

*Operation Fig. 4.*—Let us assume that the search coil $SC_1$ or $SC_2$ (Figs. 1 and 1A) is inserted in the receptacles 12 of Fig. 4 and that the search coil is moved into the magnetic field the strength of which is to be measured. This will of course cause the induction of a voltage in the search coil at all times proportional to the rate at which magnetic flux enters the turns of the coil which may vary and may continue for an unknown but short period of time. Through the medium of galvanometer $G_4$, photoelectric tube $PET_4$, and amplifier $A_4$ and for reasons heretofore given, the amplifier causes a current to flow through resistance $R_4$ which is at all times proportional to this induced potential in coil $SC_1$ or $SC_2$ and which is at each instant of value to produce a resistance current drop which is substantially equal to and opposite to the induced voltage. This current, which in practice varies, builds up kinetic energy in mass W which is proportional to the sum of the increments of this current to thereby produce a maximum swing of needle 27 (potential energy stored) which is indicative of this energy, the integrated current equivalent passing through coil 26 being proportional to the integrated voltage induced in the search coil $SC_1$ or $SC_2$. That is, the kinetic energy built up during the integrating operation of the apparatus during the initial movement of the mass of the ballistic galvanometer is converted into potential energy stored in the returning spring and this energy may be read by the extent to which this spring has been flexed.

*Structure and operation Fig. 1B.*—The shunt SH illustrated in Fig. 1B may be used with any one of the apparatuses illustrated in Figs. 1, 3, 4, and 5 in the same way as any ammeter shunt may be used with a low reading voltmeter or millivoltmeter in order to read amperes on such voltmeter, that is, this shunt may be used with the voltage integrating structures disclosed in order to integrate increments of current. In other words the apparatus illustrated in Figs. 1, 3, 4 and 5 are voltage increment integrators or voltage-time integrators and by use of shunt SH (Fig. 1B) current may be converted into volts through the medium of the ohmic resistance of the shunt SH. In using the shunt of Fig. 1B either the search coil $SC_1$ or the search coil $SC_2$ or the circuit of which is to be integrated may be plugged into the receptacles 29 (Fig. 1B) and the plugs 20 may then be plugged into the receptacles 12 of Figs. 1, 3, 4 or 5 and in so doing increments of current may be integrated by apparatuses built for the purpose of integrating increments of voltage.

*Structure Fig. 5.*—In Fig. 5 has been illustrated in somewhat more elaborated form the apparatus illustrated in Fig. 1. That is, substitute resistances $R_2$ and $R_3$ which may be substituted for resistance $R_1$, and a condenser $C_2$ which may be substituted for condenser $C_1$ have been provided and illustrated. Also, an electrical drift adjuster including an adjustable potentiometer Po has been added and the amplifier $A_1$ including amplifying tubes $T_1$, $T_2$ and $T_3$ has been shown in more detail. Also, a zero set including a push button switch PB and a discharge resistance $R_{30}$ have been added. It should be understood that similar substitute condensers, resistors and inductive reactors are presumed present in the structures of Figs. 2, 3 and 4, and that the amplifiers $A_2$, $A_3$ and $A_4$ are identical to amplifier $A_1$ of Fig. 5 and that they include similar drift adjusting potentiometers. As already stated the galvanometer $G_1$ includes a mirror M mounted on the moving coil 14 supported by a suspension pivot which has extremely low friction. By reason of this substantially frictionless bearing a very substantial deflection in response to substantially zero current flow is accomplished. The continually illuminated lamp $Lt_1$, together with suitable light concentrating means, such as a lens (not shown), a pencil of light from lamp $Lt_1$ falls on mirror M and is reflected to throw a pencil of light so as to fall to substantially equal extents on the two cathodes $Ca_1$ and $Ca_2$ of the double photo-electric tube $PET_1$. This causes substantially equal electron emission by the two cathodes $Ca_1$ and $Ca_2$ as a result of which the cathode $Ca_1$ and plate $P_2$, which are connected together, lie potentially substantially midway between the potential of cathode $Ca_2$ and plate $P_1$. The control grid of the amplifier tube $T_1$ is connected directly to the junction point of elements $Ca_1$ and $P_2$ by wire 15. The flow of current through galvanometer $G_1$ causes the light beam 13 to swing from one cathode to the other of the tube $PET_1$ to thereby cause the potential applied to grid of tube $T_1$ to move up or down and to thereby cause the current flow from plate to cathode of tube $T_1$ to increase or decrease respectively. In practice the plate current in tube $T_1$ usually will rise to thereby cause the potential on the grid of amplifier tube $T_2$ to fall by reason of the potential drop through plate resistor $R_5$. Series resistances $R_6$ and $R_7$ are used to serve as a potentiometer to reduce the voltage applied to the grid of tube $T_2$ below that of the plate of tube $T_1$. The reduction of the potential on the grid of tube $T_2$ due to movement of galvanometer $G_1$ in a particular direction causes the plate current from the plate to the cathode of tube $T_2$ to fall to thereby increase the potential existing on the plate of tube $T_2$. Since the grid of tube $T_3$ is directly connected to the plate of tube $T_2$ the potential on the grid of tube $T_3$ is increased to thereby cause an increase in the current flow from the plate to the cathode of tube $T_3$. The cathode of the tube $T_3$ normally stands at substantially the same potential as does the grounded mid-point 35 of the potentiometer $P_o$ and since this point is grounded, as shown, practically zero potential is normally applied to the voltmeter $V_m$. In fact by adjusting the contactor 36 of the potentiometer $P_o$ to the proper point on resistor $R_{10}$ the proper current will flow normally through resistance $R_8$ to cause the cathode of tube $T_3$ to be at the same potential above the negative wire 37 as the point 35 of potentiometer $P_o$ is above this negative wire 37. In other words, the cathode of tube $T_3$ is normally held at ground potential. Since the voltmeter $V_m$ is connected between the cathode of tube $T_3$ and ground no potential normally exists across the voltmeter $V_m$. Coming back to the point in the discussion where the current flow through tube $T_3$ was increased, this increase in current flow through the tube $T_3$ causes the potential on cathode of tube $T_3$ to rise above that of ground potential, by reason of the counter voltage built up in resistance $R_8$, as a result of which current is caused to flow over wire 18, resistance $R_{14}$, switch 41 and condenser $C_1$, resistance $R_1$, switch 38, wires 39 and 19 to ground and then over resistances $R_{12}$ and $R_{13}$ to the terminal minus (—) of plate battery. The flow of current in this circuit portion causes a potential to develop in resistance $R_1$ which holds the current flow in galvanometer $G_1$ substantially at zero. In other words, current is caused to flow to condenser $C_1$ at a rate dependent on the voltage induced in search coil $SC_1$ but the actual energy for causing such flow of current is not derived from the search coil but is derived from the amplifier $A_1$. The amplifier is in fact degeneratively connected so that it feeds back just enough energy to hold the current flowing through galvanometer $G_1$ substantially at zero. When the potential induced in search coil $SC_1$ is of the opposite polarity from that just considered the direction of current flow through condenser $C_1$ is reversed. A wire 40 extends from the junction point between condenser $C_1$ and resistance $R_1$ to the movable contact 36 of the potentiometer $P_o$. This potentiometer includes resistance units $R_9$, $R_{10}$, $R_{11}$, $R_{12}$ and $R_{13}$. The condenser $C_5$, bridging the resistance $R_{14}$, is of very low capacity and is used only to prevent a high frequency feed back to be set up in the amplifier which might impair its efficiency although it would not materially interfere with the accuracy of the apparatus.

*Operation Fig. 5.*—Let us assume that the search coil $SC_1$ is connected to receptacles 12 of Fig. 5. If the voltmeter is not in its zero indicating position it should be brought to zero. It may be that the condenser $C_1$ has not been entirely discharged. The condenser $C_1$ may be discharged by momentarily depressing the push button PB to allow dissipation of the energy stored therein through the resistance $R_{30}$. At times even though the condenser $C_1$ was originally entirely discharged the voltmeter $V_m$ will still not read zero. This condition may be due to what is conveniently called "drift." This lack of constancy of zero reading due to drift may be corrected by adjusting the position of contact 36 on the potentiometer $P_o$. This adjustment of the adjustable contact 36 will cause a small current to flow through galvanometer $G_1$ in a direction to cause the amplifier to function to bring the cathode of tube $T_3$ to ground potential. As already stated drift may also be adjusted to zero by adjusting the spring of the galvanometer $G_1$ and in turn the mirror M. If now the search coil is gradually positioned to be linked by the magnetic field to be measured a momentary varying potential is induced in the search coil and applied to the coil of galvanometer $G_1$ and the resistance $R_1$ in series. This will cause the galvanometer $G_1$ to operate, only to an unnoticeable extent, in that the amplifier $A_1$ (see Fig. 5) will cause current to flow in the same direction in resistance $R_1$ so that the potential drop across the coil 14 of dynamometer $G_1$ is substantially brought to zero. In this way practically no current is drawn from search coil $SC_1$ but at the same time a second current flows through condenser $C_1$ which second current at each instant is proportional to the potential existing in search coil $SC_1$. When the potential induced in search coil $SC_1$ falls to zero, because all magnetic lines have entered the coil $SC_1$, the current flowing to condenser $C_1$ also falls to zero. The potential existing across this condenser $C_1$ and voltmeter $V_m$ is however not zero because the charge on condenser $C_1$ is still there and this charge is held there by the amplifier $A_1$ and is an indication of the integrated potentials which due to magnetic flux cutting were induced in search coil $SC_1$ and is therefore also an indication of the total amount of magnetic flux which entered the coil. The party making the test may read the voltmeter as soon as its pointer comes to rest and this voltmeter reading is an indication of the magnitude of the flux field or magnetic density depending on the area of the search coil, as more fully pointed out hereinafter. It will take a long time for the condenser $C_1$ to become discharged because each increment of discharge of the condenser $C_1$ through the coil of the galvanometer $G_1$ and the search coil in series and in multiple with resistance $R_1$ produces an effect upon the amplifier $A_1$ which results in the supply of a voltage on the output leads of the amplifier to prevent such discharge and at the same time supplies the voltmeter $V_m$ with the current necessary to produce its indication. If the condenser $C_1$ is allowed to discharge in this way it will take from 20 to 30 minutes before it will be completely discharged. Ample opportunity is therefore given to read the voltmeter $V_m$ before any noticeable decrease in the charge on the condenser $C_1$ takes place. In practice the push button PB is momentarily depressed as soon as the reading has been taken. If desired the search coil may be removed from the magnetic field as soon as the reading has been taken. If this is done a second reading may be taken due to cutting of the magnetic lines of flux in the opposite direction. If this is done immediately, without first discharging the condenser, the voltmeter will return to zero, which will be a check upon the first reading taken.

In case the magnetic field to be measured is rather weak a smaller condenser $C_2$ may replace the condenser $C_1$, as by the operation of selecting switch 41. The apparatus illustrated in Fig. 5, by proper selection of the voltmeter scale, condenser size ($C_1$ or $C_2$) resistance values ($R_1$, $R_2$ or $R_3$) and search coil turns ($SC_1$ or $SC_2$) may read magnetic field strengths from that emitted by a very small sewing needle to that emitted by a large generator field pole to the same accuracy, in percent. The earth's magnetic field may be accurately measured by a search coil having only one square centimeter of cross-sectional area. By use of a larger coil a more accurate reading may be obtained. Since practically zero current flows in the search coil SC during the measurement of magnetic field strength practically zero demagnetizing effect is produced as a result of which more accurate results and readings will be obtained.

It is of course necessary in building the amplifier $A_1$ shown in Fig. 5 to make every effort to prevent undesirable, either high frequency or low frequency, feed back. The resistance $R_{14}$ and condenser $C_5$ have been included for this purpose.

In order to give a better understanding as to how the various embodiments of the invention, when employing various precision constants of capacity, resistance and inductive reactance, may be used to make various measurements, let us assume that the following symbol representations are used:

$V$ = voltage at input terminals.
$Vb$ = — voltage of battery 26 (Fig. 1C).
$Vm$ = voltage read on voltmeter $Vm$.
$I$ = amperes in input circuit.
$Im$ = amperes read on ammeter $Im$.
$t$ = time in seconds.
$R_1$ = resistance of unit $R_1$ in ohms.
$Rs$ = — resistance of unit $Rs$ in ohms.
$C_1$ = capacity of condenser $C_1$ in microfarads.
$C_3$ = capacity of condenser $C_3$ in microfarads.
$C_4$ = capacity of condenser $C_4$ in microfarads.
$H$ = magnetic flux intensity in gauss.
$A$ = area of search coil in square centimeters.
$n$ = number of turns of wire in search coil.
$M = HA$ = total magnetic flux in maxwells.
$L_1$ = inductance of coil $L_1$ in henries.
$Q_{bs}$ = reading on ballistic galvanometer in coulombs.
$q$ = charge in coulombs.
$\bar{i}$ and $\bar{V}$ = average value of current and voltage respectively.

Then the following relationships exist:
Fig. 1 (without search coil):

$$\int_0^t V dt = R_1 C_1 Vm$$

or $$Vm = \frac{\bar{V}}{R_1 C_1} t$$

or $$\bar{V} = \frac{Vm R_1 C_1}{t}$$ during a period $t$, assuming that $Vm = 0$ for $t = 0$ Fig. 1 (with search coil):

$$M = \frac{10^8 R_1 C_1 Vm}{n}$$

$$H = \frac{10^8 R_1 C_1 Vm}{nA}$$

Fig. 1 (without search coil but with Fig. 1B):

$$\int_0^t I dt = \frac{R_1 C_1 Vm}{Rs}$$

$$Vm = \frac{\bar{I} Rs}{R_1 C_1} t$$

or $$\bar{I} = \frac{R_1 C_1 Vm}{Rs t}$$

Fig. 2:

$$q = \int_0^t i dt = C_4 Vm$$

$$q = \bar{i} t = C_4 Vm$$

Figs. 2 and 1C:

$$q = Vb C_3 = C_4 Vm$$

$$C_3 = \frac{C_4 Vm}{Vb}$$

Fig. 3:

$$\int_0^t V dt = \bar{V} t = Im L_1$$

or $$\bar{V} = \frac{Im L_1}{t}$$

Figs. 3 and 1A:

$$H = \frac{10^8 L_1 Im}{nA}$$

$$M = \frac{10^8 L_1 Im}{n}$$

Fig. 4 (assuming ballistic galvanometer is calibrated in coulombs):

$$\int_0^t V dt = R_4 Q_{bs}$$

or $$\bar{V} = \frac{R_4 Q_{bs}}{t}$$

Figs. 4 and 1A:

$$H = \frac{10^8 R_4 Q_{bs}}{nA}$$

$$M = \frac{10^8 R_4 Q_{bs}}{n}$$

Figs. 4 and 1B:

$$\int_0^t I dt = \frac{R_4 O_{bs}}{Rs}$$

$$O_{bs} = \frac{\bar{I} Rs t}{R_4}$$

$$\bar{I} = \frac{O_{bs} R_4}{Rs t}$$

Fig. 5—Operation: Same as Fig. 1.

*Résumé.*—In all forms of the invention the same principle for obtaining efficiency in the integration of voltage or current and the measurement of field strength, capacity or induction is used. This principle resides in the provision of electronic means for supplying current to the measuring instrument at the same rate as the device whose characteristics are to be measured tends to supply current. In this way the devices upon which measurements are to be taken need supply only an infinitesimal amount of energy to the measuring instrument. This not only renders the apparatus more accurate but also the magnetic field, for instance, to be measured is maintained in its initial state. That is, substantially no demagnetizing effect is present. The apparatus of the present invention by reason of the above mentioned features of construction is rendered extremely slow beat as much as 20 to 30 minutes being required to allow the apparatus to restore itself to normal. It is generally understood that an integrating instrument of the type here under consideration has accuracy substantially in accordance with the slowness of its operating beat. Another feature of the present invention resides in the flexibility of the instrument. For instance, voltmeters and ammeters of various ranges may be used with the same integrating apparatus, and in this integrating apparatus condensers of various sizes and resistance units having various ohmic resistances may be used, thus enabling large or small instantaneous quantities to be integrated and measured. Another extremely desirable feature of the present invention resides in the employment of precision components except for the voltmeter or ammeter used with the apparatus. Such voltmeters and ammeters are checked frequently so that their accuracy may be relied upon. The amplifying factors of the galvanometer, photo-electric tube or amplifier does not enter into the accuracy of the instrument. Another way of stating the functioning of the apparatus of Figs. 1 and 5 is that a condenser is charged at a rate depending on a pulse of varying potential independently of its own counter-electro-motive force, so that the amplifier performs more than an amplifying function. That is, the amplifier produces current dependent on an external voltage and independently of the impedance of the circuit through which such current must flow.

Having thus shown and described several embodiments of the invention and having pointed out how the invention may be used, it should be understood that the disclosures illustrated are merely illustrative of forms the invention may take and does not exhaust all possible combinations that may be used and that various changes, modifications and additions may be made in practicing the invention without departing from the spirit and scope of the invention so long as these changes come within the scope of the following claims.

What I claim is:

1. Varying electric surge integrating apparatus comprising, a condenser, an amplifier supplying current to a circuit including said condenser, electro-responsive means connected to be controlled by said varying surge to be integrated and controlling said amplifier to cause it to generate a second surge flowing through said condenser which is at each instant substantially equal and opposite to said varying electric surge to be integrated, said circuit also being connected to said electro-responsive means to substantially neutralize the effect of said surge to be integrated upon said electro-responsive means, and means for measuring the charge on said condenser, whereby the electric energy for charging said condenser is derived from said amplifier and the charge on said condenser is a measure of the integrated value of said surge to be integrated.

2. Varying electric surge integrating apparatus comprising, a source of light, a photo-electric tube, a galvanometer connected to be controlled by the electric surge to be integrated and provided with a mirror for directing light emitted from said source upon said photo-electric tube to an extent dependent on the extent of operation of said galvanometer, an amplifier controlled by said photo-electric tube for supplying an electrical energy surge in its output circuit which tends to cause said galvanometer to be returned to its normal position, a condenser in the output circuit of said amplifier for integrating the electrical energy surge supplied by said amplifier, and means for measuring the charge on said condenser.

3. Varying electric surge integrating apparatus comprising, a source of light, a photo-electric tube, a galvanometer connected to be controlled by the electric surge to be integrated and provided with a mirror for directing light emitted from said source upon said photo-electric tube to an extent dependent on the extent of operation of said galvanometer, an amplifier controlled by said photo-electric tube for supplying an electrical energy surge in its output circuit which tends to cause said galvanometer to be returned to its normal position, a condenser included in the output circuit of said amplifier, and means for measuring the charge stored in said condenser.

4. Varying electrical surge integrating apparatus comprising; a source of light; a photo-electric tube; a galvanometer having a permanent magnet, a movable element consisting of a coil in the field of said permanent magnet and a mirror for swinging a light beam from said light source upon said photo-electric tube to an extent dependent on the extent of movement of said element; means for inducing in said coil the electrical surge to be integrated; an amplifier controlled by said photo-electric tube and having its output circuit connected to said coil in such a manner that slight movement of said element due to the surge to be integrated will cause said light beam to swing in a direction to cause said amplifier to act upon said coil so as to return it substantially to its original position; a condenser included in said output circuit; and a volt-meter for measuring the charge on said condenser.

5. Varying electrical surge integrating apparatus comprising; a source of light; a photo-electric tube; a galvanometer having a permanent magnet, a movable element consisting of a coil in the field of said permanent magnet and a mirror for swinging a light beam from said light source upon said photo-electric tube to an extent dependent on the extent of movement of said element; means for subjecting said coil to the electrical surge to be integrated; an amplifier controlled by said photo-electric tube and having its output circuit connected to said coil in such a manner that slight movement of said element due to the surge to be integrated will cause said light beam to swing in a direction to cause said amplifier to act upon said coil so as to return it substantially to its original position; a condenser included in the output circuit of said amplifier; and means for measuring the charge stored in said condenser.

6. A magnetic flux meter comprising; a search coil for linking the magnetic field to be measured; a photo-electric tube; a galvanometer including an operating coil, a light source and a mirror for projecting light from said light source upon said photo-electric tube to an extent dependent on the extent of movement of said operating coil; a resistance unit; a circuit including said search coil, said galvanometer coil and said resistance unit in series; an amplifier controlled by said photo-electric tube and having its output circuit connected across said resistance unit; a condenser connected in series in said output circuit; and means for indicating the charge on said condenser.

7. Electric current surge integrating apparatus comprising; a photo-electric tube; a galvanometer including an operating coil, a light source and a mirror for projecting light from said light source upon said photo-electric tube to an extent dependent on the extent of operation of said coil; an input circuit for said apparatus including said coil; an amplifier controlled by said photo-electric tube and having an output circuit connected to said coil in such manner that operation of said coil due to current flowing in said input circuit will cause the amplifier to produce current in its output circuit and in said coil which substantially neutralizes the current flowing in said coil through the input circuit of said apparatus; a condenser in said output circuit; and means for indicating the charge upon said condenser.

8. An electric varying potential integrating apparatus comprising, electro-responsive means connected to respond to the varying potential, a condenser, and electronic means controlled by said electro-responsive means and having an output circuit including said condenser and connected to said electro-responsive means in such manner as to substantially neutralize the effect of said varying potential acting on said electro-responsive means to thereby charge said condenser by current flow thereinto at a rate proportional to said potential irrespective of the counterpotential existing in said condenser, and means for measuring the charge on said condenser.

9. A magnetic flux meter comprising; a search coil for linking the magnetic field to be measured; a resistance unit; electro-responsive means included in series with said resistance unit and said search coil; an amplifier controlled by said electro-responsive means and having an output circuit included in series with said resistance unit and so polarized that the potential induced in said search coil will cause said electro-responsive means to control said amplifier to cause current to flow in said output circuit and said resistance unit in series in a direction to produce a voltage drop in said resistance unit which opposes and is substantially equal to said induced potential; a condenser included in said output circuit; and means for indicating the charge on said condenser.

ROBERT H. DICKE.

REFERENCES CITED

The following references are of record in the file of this patent:

UNITED STATES PATENTS

| Number | Name | Date |
|---|---|---|
| 2,012,837 | Tear | Aug. 27, 1935 |
| 2,117,894 | Lenehan | May 17, 1938 |
| 2,136,682 | Gilbert | Nov. 15, 1938 |
| 2,297,543 | Eberhardt et al. | Sept. 29, 1942 |
| 2,364,474 | Rich | Dec. 5, 1944 |
| 2,367,614 | Rich | Jan. 16, 1945 |
| 2,459,730 | Williams | Jan. 18, 1949 |